United States Patent
Randall

(10) Patent No.: US 8,867,435 B2
(45) Date of Patent: Oct. 21, 2014

(54) METHOD FOR DETERMINING SUCCESSFUL RECEIPT AT A MOBILE TERMINAL

(75) Inventor: David Randall, Romsey (GB)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 902 days.

(21) Appl. No.: 11/883,926

(22) PCT Filed: Feb. 6, 2006

(86) PCT No.: PCT/GB2006/000421
§ 371 (c)(1), (2), (4) Date: Jun. 5, 2009

(87) PCT Pub. No.: WO2006/085059
PCT Pub. Date: Aug. 17, 2006

(65) Prior Publication Data
US 2009/0252074 A1 Oct. 8, 2009

(30) Foreign Application Priority Data

Feb. 8, 2005 (GB) ................................. 0502473.2

(51) Int. Cl.
- *H04W 4/00* (2009.01)
- *H04W 76/00* (2009.01)
- *H04W 28/04* (2009.01)
- *H04L 12/18* (2006.01)

(52) U.S. Cl.
CPC ............ *H04W 76/002* (2013.01); *H04W 28/04* (2013.01); *H04L 12/1877* (2013.01); *H04L 12/189* (2013.01)
USPC ............................................ 370/328; 370/312

(58) Field of Classification Search
USPC ......... 370/310, 312, 328, 329, 431, 432, 229, 370/230, 235, 236; 455/422.1, 450
See application file for complete search history.

(56) References Cited

U.S. PATENT DOCUMENTS

| | | | |
|---|---|---|---|
| 7,058,407 B2* | 6/2006 | Chi et al. | 455/449 |
| 7,366,124 B2* | 4/2008 | Lee et al. | 370/312 |
| 7,636,331 B2* | 12/2009 | Lee et al. | 370/328 |
| 7,773,517 B2* | 8/2010 | Abdel-Kader et al. | 370/232 |
| 7,894,381 B2* | 2/2011 | Cho et al. | 370/328 |
| 2001/0034788 A1 | 10/2001 | McTernan et al. | |
| 2009/0201854 A1* | 8/2009 | Roger | 370/328 |

FOREIGN PATENT DOCUMENTS

| | | |
|---|---|---|
| EP | 1 392 074 A2 | 2/2004 |
| EP | 1 420 551 A2 | 5/2004 |
| EP | 1 524 800 A2 | 4/2005 |
| WO | 03/017701 A1 | 2/2003 |

OTHER PUBLICATIONS

Universal Mobile Telecommunications System (UMTS); Introduction of Multimedia Broadcast/Multicast Service (MBMS) in the Radio Access Network (RAN); Stage 2 (3GPP TS 25.346 Version 6.3.0 Release 6); Dec. 2004; pp. 1-59.
International Search Report dated Feb. 5, 2006 and issued in corresponding International Patent Application PCT/GB2006/000421.
United Kingdom Search Report dated Nov. 8, 2005 and issued in corresponding United Kingdom Patent Application GB0502473.2.

* cited by examiner

*Primary Examiner* — Michael Thier
*Assistant Examiner* — Feben M Haile
(74) *Attorney, Agent, or Firm* — Staas & Halsey LLP

(57) ABSTRACT

Transmissions sent on a multicast broadcast multimedia service control channel (MCCH) to a mobile terminal are determined to be successfully received by signalling the expected number of messages within the transmission; and terminating receipt of the MCCH only when the number of messages received is equal to the number of messages signalled.

7 Claims, 1 Drawing Sheet

METHOD FOR DETERMINING SUCCESSFUL RECEIPT AT A MOBILE TERMINAL

CROSS REFERENCE TO RELATED APPLICATIONS

This application is based on and hereby claims priority to United Kingdom Patent Application No. 0502473.2 filed on Feb. 8, 2005, the contents of which are hereby incorporated by reference.

BACKGROUND

Described below is a method of determining successful receipt at a mobile terminal in a communication system, in particular for second and third generation mobile phone systems, such as Universal Mobile Telecommunications System Terrestrial Radio Access Network (LITRAN), offering multicast broadcast multimedia services (MBMS) or other broadcast services.

Broadcast services, such as MBMS which is standardized in radio access network (RAN), are becoming more and more important for mobile communication networks. However, a UE receiving messages on an MBMS control channel has no way of determining whether it has received safely all the messages in a transmission that it needs.

SUMMARY

The method of determining successful receipt at a mobile terminal of transmissions sent on a multicast broadcast multimedia service (MBMS) control channel (MCCH) described below includes signalling the expected number of messages within the transmission; and terminating receipt of the MCCH only when the number of messages received is equal to the number of messages signalled.

Preferably, the expected number of messages signalled is the total number of neighbor cell messages.

Preferably, the total number of neighbor cell messages is signalled in an MBMS modified services information message.

The total number of neighbor cell messages may be the number of neighbor cells in the transmission or the number of neighbor cells in the transmission associated with each service.

BRIEF DESCRIPTION OF THE DRAWINGS

These and other objects and advantages will become more apparent and more readily appreciated from the following description of an example of a method of determining successful receipt at a mobile terminal of transmissions sent on an MBMS control channel (MCCH), taken in conjunction with the accompanying drawings in which.

DETAILED DESCRIPTION OF THE PREFERRED EMBODIMENT

Figure 1:
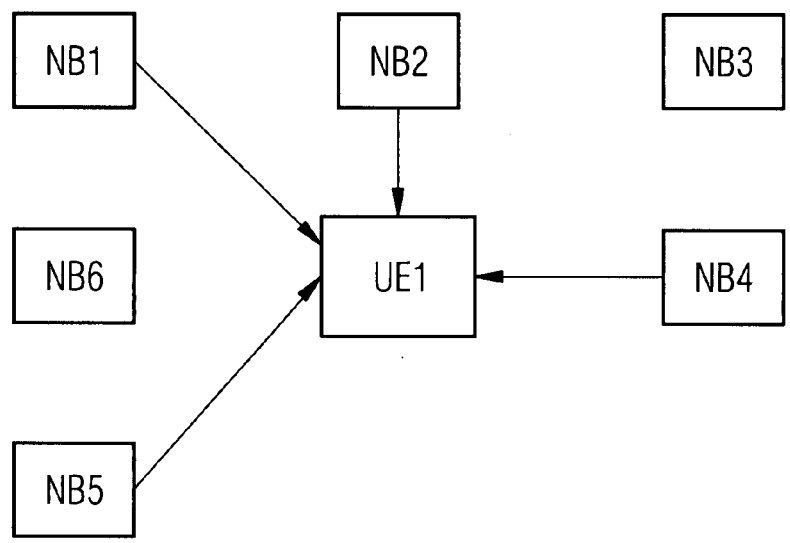
FIG. 1 is a block diagram illustrating the method described below.

Reference will now be made in detail to the preferred embodiments, examples of which are illustrated in the accompanying drawings, wherein like reference numerals refer to like elements throughout.

In order to ensure that a mobile terminal or UE knows that it has received all messages due to it, specifically the number of MBMS neighbor cell point to multipoint (p-t-m) radio bearer (RB) information messages, the number of neighbor cells is signalled in the 3 GPP MBMS control signalling.

Transmissions on the 3GPP MBMS control channel (MCCH) consist of a number of messages. An MCCH transmission will contain an MBMS modified services information message and an MBMS unmodified services information message. It may also contain an MBMS general information message, an MBMS common p-t-m RB message, an MBMS current cell p-t-m RB message and one or more MBMS neighbor cell p-t-m RB messages (one message per neighbor cell).

A UE that is required to receive an MBMS p-t-m bearer for an MBMS service must continue to receive the MCCH transmissions until it has received the MBMS common p-t-m RB message, the MBMS current cell p-t-m RB message and all MBMS neighbor cell p-t-m RB messages that contain information relating to the service. Messages are received from the transmissions sequentially. It is not possible for the UE to detect that it has failed to receive a message, so a mechanism is needed in order that the UE knows that it has received all of the neighbor cell messages that it requires.

In one embodiment the total number of neighbor cells (equivalent to one message each) in the transmission is signalled in an MCCH message. For example, the number may be signalled in the MBMS modified services information message or the MBMS common p-t-m RB message, or the MBMS current cell p-t-m RB message.

In another embodiment, the total number of neighbor cells (equivalent to one message each) is signalled in the transmission associated with each service in an MCCH message. An example of this is signalling in the MBMS current cell p-t-m RB message.

A UE that has received one of these parameters (only one would be signalled) would be able to compare the number of neighbor cell messages that it has received with the total number indicated in the signalling and identify if it has received all of the information that it requires. It can then stop receiving the MCCH.

Figure 2:
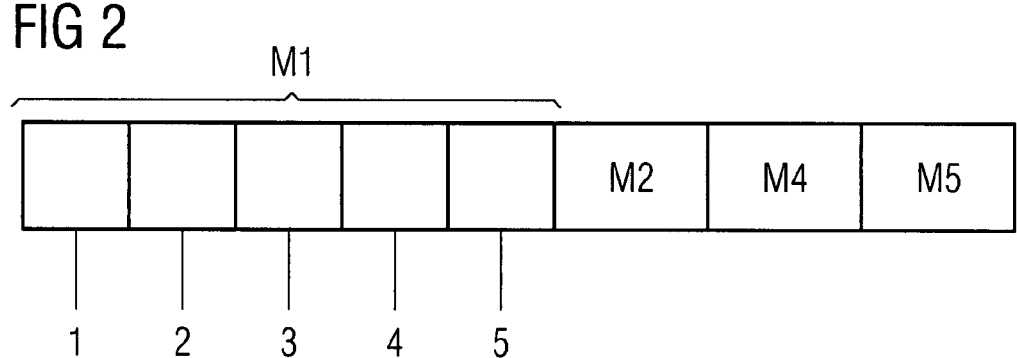
FIG. 2 is a message transmission diagram illustrating the neighbor cell messages received in the method of FIG. 1.

FIG. 1 illustrates an example of a number of neighbor cells around a UE, from some of which NB2, NB4 and NB5 a UE, UE1 will receive an MBMS service transmission which the UE will combine with an MBMS transmission from the controlling node B, NB1. As shown in FIG. 2, a control transmission M1 from the controlling node B, NB1 to UE1 is split up into the messages 1 to 5, including an MBMS modified services information message 1; an MBMS unmodified services information message 2, an MBMS general information message 3, an MBMS common p-t-m RB message 4, and an MBMS current cell p-t-m RB message 5. In addition the transmission includes MBMS neighbor cell p-t-m RB messages, one message per neighbor cell, from neighbor cells NB2, message M2; NB4, message M4 and NB5, message M5. As explained above, a transmission does not always include all of the message types given in this example and the number signalled is adapted according to which messages are actually present in the transmission.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A method of determining successful receipt at a mobile terminal of transmissions sent on a multicast broadcast multimedia service control channel, comprising:

signaling an expected number of messages within a transmission in a multicast broadcast multimedia service control channel message;

determining, at the mobile terminal, a number of messages received and comparing the number of messages received with the expected number of messages indicated by said signaling;

terminating receipt of the multicast service control channel only when the number of messages received is equal to the number of messages signaled, wherein the expected number of messages signaled represents a total number of neighbor cell messages.

2. A method according to claim 1, wherein the total number of neighbor cell messages is signaled in a multicast broadcast multimedia service modified services information message.

3. A method according to claim 1, wherein the total number of neighbor cell messages equals a number of neighbor cells in the transmission.

4. A method according to claim 1, wherein the total number of neighbor cell messages is a number of neighbor cells in the transmission associated with each service.

5. A method according to claim 1, wherein the transmission includes a multicast broadcast multimedia service (MBMS) modified services information message and an MBMS unmodified services information message.

6. A method according to claim 5, wherein the transmission further includes one or more of an MBMS general information message, an MBMS common point-to-multipoint radio bearer message, an MBMS current cell point-to-multipoint radio bearer message, and one or more MBMS neighbor cell point-to-multipoint radio bearer messages.

7. A mobile terminal for determining successful receipt of transmissions sent on a multicast broadcast multimedia service control channel, the mobile terminal comprising:

one or more processors configured to:

receive an expected number of messages being signaled within a transmission in a multicast broadcast multimedia service control channel message;

compare a number of received messages with respect to the expected number of messages being signaled within the transmission; and terminate further receipt of the multicast broadcast multimedia service control channel only when the number of messages received is equal to the number of messages signaled, wherein the expected number of messages signaled represents a total number of neighbor cell messages.

* * * * *